(No Model.)
R. E. GAMBLE.
GARDEN IMPLEMENT.
No. 417,554. Patented Dec. 17, 1889.
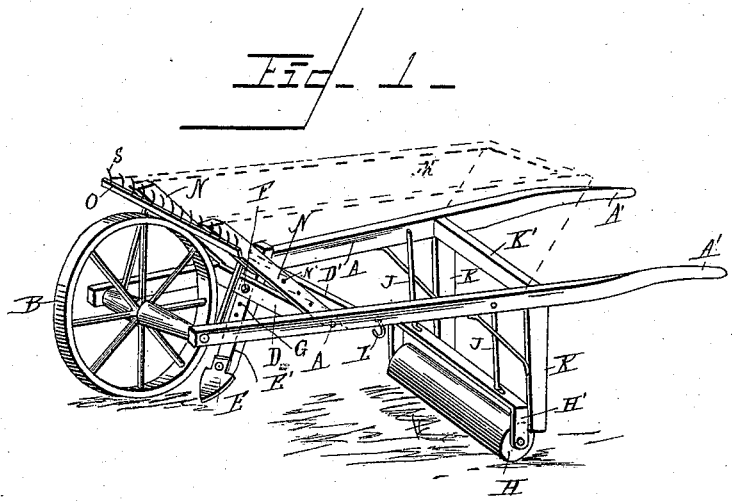
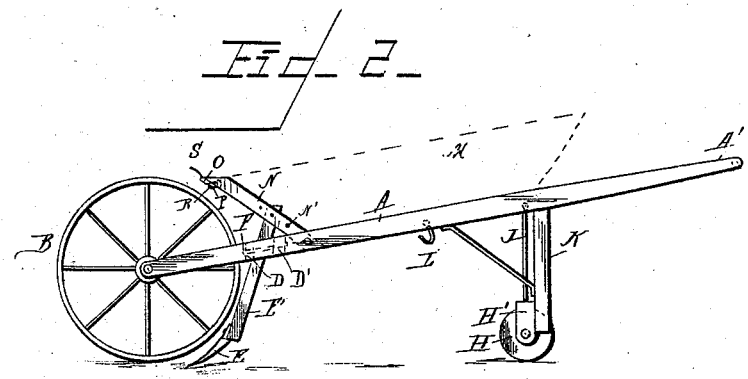
Witnesses
Wm. T. Robertson
T. E. Robertson
Inventor
Rufus E. Gamble
By his Attorneys
John G. Manahan
N. PETERS, Photo-Lithographer, Washington, D. C.

UNITED STATES PATENT OFFICE.

RUFUS E. GAMBLE, OF MECHANICSVILLE, MISSOURI.

GARDEN IMPLEMENT.

SPECIFICATION forming part of Letters Patent No. 417,554, dated December 17, 1889.

Application filed September 6, 1889. Serial No. 323,170. (No model.)

*To all whom it may concern:*

Be it known that I, RUFUS E. GAMBLE, a citizen of the United States, residing at Mechanicsville, in the county of St. Charles and State of Missouri, have invented certain new and useful Improvements in Garden Implements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to improvements in garden implements; and it consists more essentially in a combination of a barrow, cultivator, roller, and rake, having its several parts so arranged as to be capable of separate or joint employment.

In the drawings, Figure 1 is a perspective of an implement involving my invention. Fig. 2 is a side elevation thereof.

A A are the sides of the frame of the machine, which at the rear are extended and formed into handles A'. The side plates A are journaled at their front ends, respectively, to each end of the axle of the carrying-wheel B.

D is a front cross-beam, and D' a rear cross-beam, seated transversely near the center of the implement and suitably united at each end of the plates A A, respectively.

E is the shovel, suitably attached to its shank E', the upper end of the latter being projected between the cross beams D and D' and held therein by means of the bolt F, passed longitudinally of the frame through the beams D and D' and the shank E'. A series of holes G are formed in the shank E', attached to the shovel E, for the optional reception of the bolt F, whereby the depth of the cut of the shovel E may be readily adjusted. Two or more shovels may be attached in like manner, if desired.

In the use of this function of my invention the handles A' are grasped by the operator and the machine propelled as the ordinary barrow. The wheel B is provided with a tread of sufficient width to prevent said wheel from sinking too much within the earth, and as the shovel E is seated behind the tread of said wheel the track made by the latter is of no disadvantage. The front ends of the frame A being supported by the wheel B, the shovel E may be driven at a certain depth below the surface of the ground and prevented by said wheel from entering the ground farther than may be desired.

H is a roller seated transversely under the frame A by means of the bracket H', in the depending ends of which the roller H is pivoted. Vertical rods J are attached at their lower ends to the horizontal portion of the bracket H', and, extending upward, are pivotally attached, respectively, in any suitable mode to the sides A. The bracket H' is slightly longer than the roller H, and at the localities of such extension abuts against the front edge of the legs K of the barrow. This engagement of the legs K with the bracket H' holds the latter and the attached roller H in position. Additional pressure upon the roller H can be exerted at any time through the medium of the handles A'.

A hook L is suitably attached to one or both of the sides A in position to engage the rod or rods J when the roller is swung forward and upward out of contact with the earth, and said roller is thereby carried when not intended for use.

K' is the rear cross-brace between the sides A A.

M is a box seated in any suitable way upon the sides A A.

N N are upwardly and forwardly projecting braces against which rests the front of the box M.

O is a rake-head adjustably attached to the front sides of the braces N by means of the downward projections P, attached to the rake-head O and bolted adjustably by means of the transverse bolts R to the front surface of the upper ends of the braces N.

A series of holes N' in the side braces afford means of changing the altitude of the rake-head O.

The rake-head O is provided with a series of teeth S, having a slight curvature toward the front.

In the use of the rake O the implement is inverted from the position shown in the drawings and carried by the wheel B and the handles A' in substantially the same mode described in reference to the shovel E. The action of the rake obliterates the track of the wheel B in the same manner as before described in reference to the shovel E.

The advantages of my invention consist in its affording in one implement means for stirring, raking, and rolling the ground in addition to the advantage of the box M for conveying loose material. At such seasons as the machine is not required for cultivation the roller, rake, and shovel can be removed and the residue utilized as a common barrow.

My invention is adapted for use in ordinary gardening and for the cultivation of crops in inclosures of such small area as to render the employment of a team impracticable.

The advantage of the use of the rake O and the shovel E in the construction shown consists largely in the fact that the depth of their cut is gaged by the carrying-wheel B, and by means of the handles A' the pressure of the roller H may be graduated as desired.

From the foregoing it is obvious that the implement consists, essentially, of a reversible frame, a shovel or plow-point secured to and adjustable upon the frame, and a rake similarly secured to and adjustable thereon, the shovel and rake being on opposite sides of the frame, so that when one is in use the other will be raised and out of the way. It is also obvious that the roller, hung upon a swinging bracket, coacts with the shovel or plow-point, and is held in position by the legs K when the shovel is in use. It can also be swung forward and lifted out of the way by means of the hooks L when it is not necessary to use it.

What I claim as my invention, and desire to secure by Letters Patent of the United States, is—

1. A garden implement consisting of a reversible frame having its side rails formed into handles at their rear ends, a wheel with its axle journaled between the front ends of said side rails, the rake having the side bars of its frame attached to and adjustable upon the side rails of the main frame, the shovel or plow-point having its standard attached to and adjustable upon cross-bars connecting the side rails of the main frame, the said shovel and rake projecting in opposite directions from the main frame, and the roller journaled in a bracket attached to the main frame on the same side thereof and in rear of the shovel or plow-point, substantially as specified.

2. The herein-described garden implement, consisting of the reversible main frame composed of the side rails A A, cross-bars D, D', and K', and legs K, the wheel with its axle journaled in and between the front end of said side rails, the rake o, having the side bars N of its frame adjustably attached to the side rails of the main frame, the shovel or plow-point E, having its standard E' adjustably attached to the main frame, and the roller H, journaled in the bracket H', swung to the main frame by the bars J in rear of said shovel and in front of the legs K, substantially as specified.

In testimony whereof I affix my signature in presence of two witnesses.

RUFUS E. GAMBLE.

Witnesses:
JASPER N. CASTLIO,
HIRAM B. CASTLIO.